United States Patent
Gao et al.

(10) Patent No.: US 8,009,776 B2
(45) Date of Patent: Aug. 30, 2011

(54) TELEVISION RECIEVER WITH AUTOMATIC GAIN CONTROL (AGC)

(75) Inventors: Li Gao, Austin, TX (US); Saroj Rout, Nashua, NH (US)

(73) Assignee: Silicon Laboratories Inc., Austin, TX (US)

( * ) Notice: Subject to any disclaimer, the term of this patent is extended or adjusted under 35 U.S.C. 154(b) by 917 days.

(21) Appl. No.: 11/528,943

(22) Filed: Sep. 28, 2006

(65) Prior Publication Data

US 2007/0030929 A1  Feb. 8, 2007

Related U.S. Application Data

(63) Continuation-in-part of application No. 11/093,547, filed on Mar. 30, 2005.

(51) Int. Cl.
*H04L 27/08* (2006.01)
*H04N 5/52* (2006.01)

(52) U.S. Cl. .................... 375/345; 455/234.1

(58) Field of Classification Search .......... 375/345, 375/346, 349, 350; 455/130, 230, 232.1, 455/234.1, 249.1, 250.1, 239.1, 240.1, 240.2, 455/241.1, 242.2, 245.2, 253.2, 254; 330/250, 330/278, 284; 348/500, 525, 528
See application file for complete search history.

(56) References Cited

U.S. PATENT DOCUMENTS

| | | | |
|---|---|---|---|
| 5,737,035 A | 4/1998 | Rotzoll | |
| 6,037,999 A * | 3/2000 | Kunishima | 348/731 |
| 6,052,566 A * | 4/2000 | Abramsky et al. | 455/67.11 |
| 6,061,096 A | 5/2000 | Limberg | |
| 6,134,430 A | 10/2000 | Younis et al. | |
| 6,177,964 B1 | 1/2001 | Birleson et al. | |
| 6,377,315 B1 | 4/2002 | Carr et al. | |
| 7,203,472 B2 * | 4/2007 | Seppinen et al. | 455/226.1 |
| 2003/0153289 A1 * | 8/2003 | Hughes et al. | 455/138 |
| 2004/0021798 A1 * | 2/2004 | Lindstrom et al. | 348/731 |
| 2004/0207761 A1 | 10/2004 | Paik et al. | |

FOREIGN PATENT DOCUMENTS

| EP | 0 684 707 A1 | 11/1995 |
|---|---|---|
| EP | 2000 041199 | 8/2000 |

OTHER PUBLICATIONS

"Wireless Components, 3-Band Digital TV/Set-Top-Box Tuner IC," TUA6034, TUA6036, TAIFUN, Version 2.4 Specification, Infinion Technologies, Mar. 2003.

* cited by examiner

*Primary Examiner* — Dac V Ha
*Assistant Examiner* — Vineeta S Panwalkar
(74) *Attorney, Agent, or Firm* — Polansky & Associates, P.L.L.C.; Paul J. Polansky; R. Michael Reed

(57) ABSTRACT

A radio frequency (RF) signal is attenuated using first (220) and second (241) attenuation elements. In one embodiment an initial overall attenuation of the RF signal is set using both the first (220) and second (241) attenuation elements during a calibration period. The initial overall attenuation of the RF signal is adjusted using only the first attenuation element during a normal operation period. In another embodiment the initial overall attenuation is determined and is provided using either, only the first attenuation element (220) or both the first attenuation element (220) and the second attenuation element (241) based on a value of the initial overall attenuation.

16 Claims, 3 Drawing Sheets

TELEVISION RECIEVER WITH AUTOMATIC GAIN CONTROL (AGC)

This application is a continuation-in-part of U.S. patent application Ser. No. 11/093,547, filed Mar. 30, 2005, entitled "Television Receiver with Automatic Gain Control," invented by Andrew W. Dornbusch, Li Gao, and James M. Nohrden, and assigned to the assignee hereof.

TECHNICAL FIELD

The present application generally relates to receivers, and more particularly to receivers such as television receivers that use automatic gain control (AGC).

BACKGROUND

Contemporary television receivers are required to operate in complex environments. For example analog (NTSC/PAL/Secam) and digital (ATSC/DVB/ISDB) television (DTV) signals now coexist within a crowded signal spectrum. The analog and DTV signals have different characteristics and place different requirements on television receivers. For example, the signal level (normally expressed as signal-to-noise ratio or SNR) required to demodulate a tuned DTV signal is much lower than that required to demodulate a tuned analog signal. In addition television receivers are often required to discriminate weak signals from geographically distant transmitters, while in the presence of spectrally near channels such as adjacent channels from nearby transmitters. The different characteristics of the analog and digital signals and various signal levels make it difficult to design receivers that are capable of tuning all channels with acceptable results.

To ensure proper output signal levels, television receivers commonly use automatic gain control (AGC). AGC is a mechanism that automatically adjusts the gain of a circuit such as a tuner in response to differences in received signal level to ensure that acceptable levels are available for subsequent processing.

Known television receiver AGC circuits attenuate the power in an input radio frequency (RF) signal in proportion to the power detected in an intermediate frequency (IF) tuned signal. This AGC technique, however, fails to account for power in signal spectra that fall outside of any filtering that may occur prior to the power detector and thus may cause components such as amplifiers, mixers, and filters to distort. Thus known AGC techniques properly control the gain of the tuned signal but may fail to properly manage the gain due to other signals.

What is needed, then, is a receiver such as a television receiver that performs AGC more flexibly in today's complex spectral environments while keeping distortion low.

BRIEF SUMMARY

In one form a radio frequency (RF) signal using a first attenuation element, and the RF signal is attenuated using a second attenuation element. An initial overall attenuation of the RF signal is set using both the first and second attenuation elements during a calibration period. The initial overall attenuation of the RF signal is adjusted using only the first attenuation element during a normal operation period.

In another form a radio frequency (RF) signal is attenuated using first and second attenuation elements. An initial overall attenuation of the RF signal is determined. The initial overall attenuation is provided using either, only the first attenuation element, or both the first attenuation element and the second attenuation element, based on a size of the initial overall attenuation.

In yet another form a receiver includes a signal path, a power detector, and an automatic gain control (AGC) circuit. The signal path has an input for receiving a radio frequency (RF) signal, and an output, and comprises first and second attenuation elements. The power detector has an input coupled to the output of the signal path, and an output. The AGC circuit has an input coupled to the output of the power detector, and outputs coupled to the first and second attenuation elements. The AGC circuit sets attenuations of the first and second attenuation elements to provide an initial overall attenuation, using either, only the first attenuation element, or both the first attenuation element and the second attenuation element, based on a size of the initial overall attenuation.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
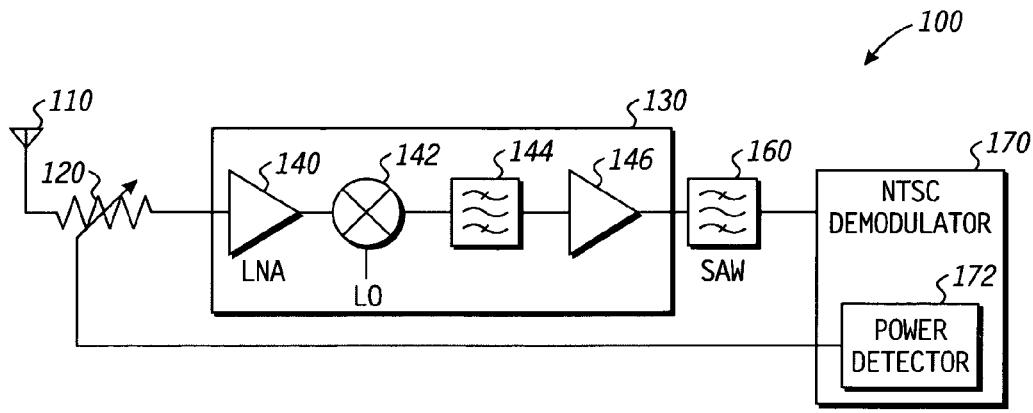
FIG. 1 illustrates in partial block diagram and partial schematic form a television receiver circuit known in the prior art.

FIG. 1 illustrates in partial block diagram and partial schematic form a television receiver circuit 100 known in the prior art. Television receiver 100 includes generally an antenna 110, an attenuator 120, a tuner 130, a surface acoustic wave (SAW) filter 160, and a National Television Standards Committee (NTSC) demodulator 170. Antenna 110 receives a broadband radio frequency (RF) signal. As used herein, a "radio frequency signal" means an electrical signal conveying useful information and having a frequency from about 3 kilohertz (kHz) to thousands of gigahertz (GHz), regardless of the medium through which such signal is conveyed. Thus an RF signal may be transmitted through air, free space, coaxial cable, fiber optic cable, etc. In the context of North American television receivers, the television signal is an RF signal having content in the range of between 48 megahertz (MHz) and 870 MHz. Attenuator 120 has a first terminal connected to antenna 110, a second terminal, and a control terminal.

Tuner 130 has an input terminal connected to the second terminal of attenuator 120, and an output terminal for providing a tuned IF output signal. Tuner 130 includes a low noise amplifier (LNA) 140, a mixing element 142, a bandpass filter 144, and an amplifier 146. LNA 140 has an input terminal connected to the second terminal of attenuator 120, and an output terminal. Mixing element 142 has a first input terminal connected to the output terminal of LNA 140, a second input terminal for receiving a local oscillator signal labeled "LO", and an output terminal. Bandpass filter 144 has an input terminal connected to the output terminal of mixing element 142, and an output terminal. Amplifier 146 has an input terminal connected to the output terminal of bandpass filter 144, and an output terminal for providing the tuned IF signal.

SAW filter 160 has an input terminal connected to the output terminal of amplifier 146, and an output terminal. NTSC demodulator 170 has an input terminal connected to the output terminal of SAW filter 160, an output terminal connected to the control terminal of attenuator 120, and provides output signals to properly drive video and audio devices, not shown in FIG. 1.

Receiver 100 provides a gain to the RF input signal by amplifying it in LNA 140. Amplifier 146 further amplifies the mixed signal. Moreover, mixer 142 and filter 144 may provide amplification as well, depending on their design. The AGC mechanism ensures that the tuned IF signal received at the input of NTSC demodulator 170 has an acceptable SNR. As part of this mechanism NTSC demodulator 170 includes a power detector 172 that measures the power in the tuned IF signal and then provides a control signal to cause attenuator 120 to properly attenuate the signal.

Note that receiver 100 may be adapted for an Advanced Television Standards Committee (ATSC) system by replacing NTSC demodulator 170 with an ATSC demodulator. A typical ATSC demodulator does not include a power detector, so the ATSC receiver would require a separate power detector to measure the power at the output of amplifier 146 and a control circuit to adjust the gain of attenuator 120 in response to the measured power. Additionally an ATSC demodulator may require additional gain before or after SAW filter 160.

Figure 2:
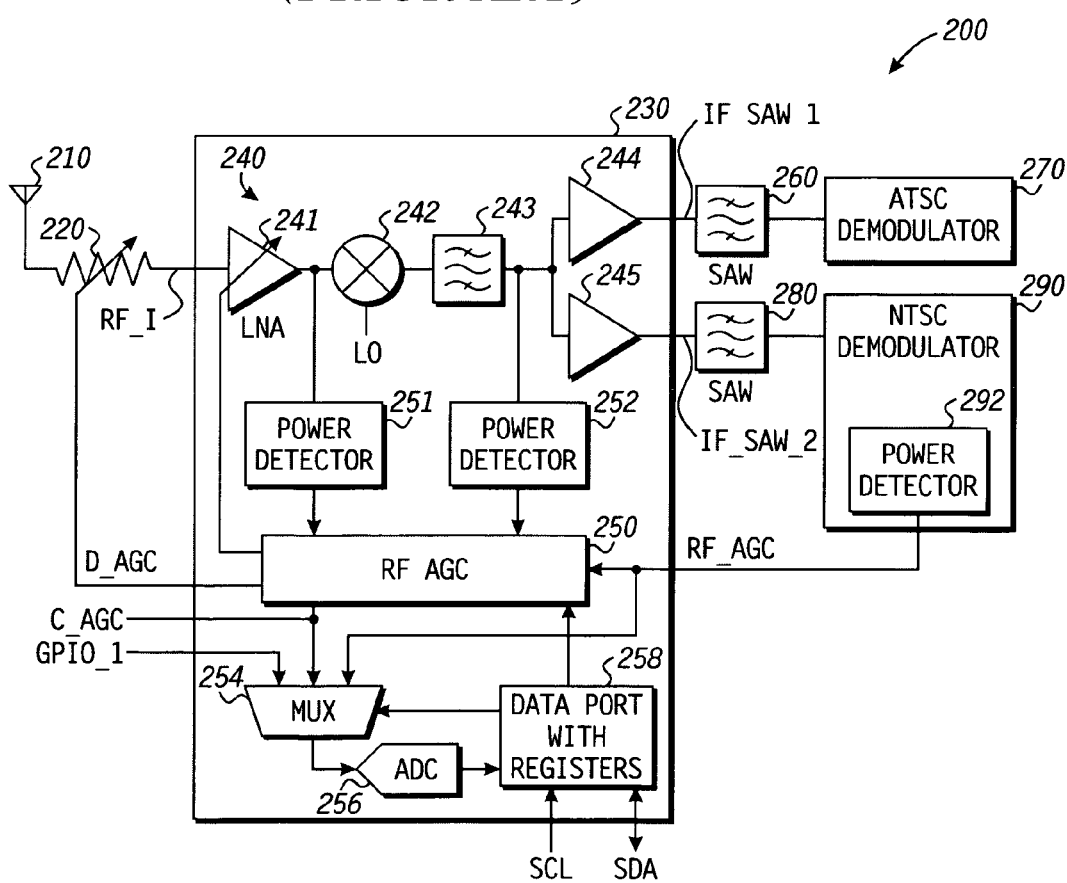
FIG. 2 illustrates in partial block diagram and partial schematic form a television receiver circuit according to the present invention.

FIG. 2 illustrates in partial block diagram and partial schematic form a television receiver circuit 200 according to the present invention. Television receiver circuit 200 includes generally an antenna 210, an attenuator 220, a television tuner integrated circuit (IC) 230, a surface acoustic wave (SAW) filter 260, an ATSC demodulator 270, a SAW filter 280, and an NTSC demodulator 290. Antenna 210 is adapted to receive a broadband RF signal having television signal content in the range of from 48 to 870 megahertz (MHz). Attenuator 220 has a first terminal connected to antenna 210, a second terminal, and a control terminal.

Television tuner IC 230 has several terminals for receiving power, ground, and various signal input and output terminals used in the operation thereof. FIG. 2 illustrates only those signal terminals pertinent to understanding the present invention. Television tuner IC 230 has an RF input terminal connected to the second terminal of attenuator 220 for receiving a signal labeled "RF_I"; an AGC output terminal connected to the control terminal of attenuator 220 for providing a signal labeled "D_AGC"; a capacitive time constant output terminal labeled "C_AGC"; first and second IF output terminals for providing IF output signals to SAW filters 260 and 280 labeled "IF_SAW_1" and "IF_SAW_2", respectively; an RF AGC control input terminal for receiving a detected power signal from NTSC demodulator 290 for receiving a signal labeled "RF_AGC"; a serial data input/output signal labeled "SDA"; a serial clock signal labeled "SCL"; and a general-purpose I/O terminal for receiving a signal labeled "GPIO_1". Note that RF_I, D_AGC, IF_SAW_1, and IF_SAW_2 are differential signals each including both a positive component and a negative component, but are shown in FIG. 2 as being conducted on single terminals for ease of illustration. In an alternate embodiment, television tuner IC 230 may process single-ended signals.

SAW filter 260 has an input terminal connected to the IF_SAW_1 terminal of television tuner IC 230, and an output terminal. ATSC demodulator 270 has an input terminal connected the output terminal of SAW filter 260, and various audio and video output terminals not shown in FIG. 2. Note that a gain stage may be required before or after SAW filter 260, and if present may be implemented as a variable gain amplifier whose gain is controlled by ATSC demodulator 270, but this additional amplifier is not shown in FIG. 2. Likewise SAW filter 280 has an input terminal connected to the IF_SAW_2 terminal of IC tuner 230, and an output terminal. NTSC demodulator 290 has an input terminal connected the output terminal of SAW filter 280, an output terminal for providing RF_AGC, and various audio and video output terminals not shown in FIG. 2.

More particularly television tuner IC 230 includes a signal processing path 240, an RF AGC circuit 250, a power detector 251, a power detector 252, a multiplexer 254, an analog-to-digital converter 256, and a data port with registers 258. Signal processing path 240 has an input for receiving RF_I and first and second output terminals for respectively providing IF_SAW_1 and IF_SAW_2. Signal processing path 240 includes a low noise amplifier (LNA) 241, a mixing element 242, a bandpass filter 243, an amplifier 244, and an amplifier 245. LNA 241 has a signal input terminal for receiving RF_I, an output terminal, and a control input terminal. Mixing element 242 has a first input connected to the output terminal of LNA 241, a second input terminal for receiving a local oscillator mixing signal labeled "LO", and an output terminal. Bandpass filter 243 has an input terminal connected to the output terminal of mixing element 242, and an output terminal. Amplifier 244 has an input terminal connected to the output terminal of bandpass filter 243, and an output terminal for providing IF_SAW_1. Amplifier 245 has an input terminal connected to the output terminal of bandpass filter 243, and an output terminal for providing IF_SAW_2.

Power detector 251 has an input terminal connected to the output terminal of LNA 241, and an output terminal. Power detector 252 has an input terminal connected to the output terminal of filter 243, and an output terminal. RF AGC circuit 250 has a first input terminal connected to the output terminal of power detector 251, a second input terminal connected to the output terminal of power detector 252, a third input terminal for receiving RF_AGC, a data input terminal, a first AGC output terminal for providing D_AGC, a second AGC output terminal connected to the control input terminal of LNA 241, and a third output terminal for providing C_AGC. MUX 254 has a first input terminal for receiving GPIO_1, a second input terminal for receiving C_AGC, a third input terminal for receiving RF_AGC, a control input terminal, and an output terminal. ADC 256 has an input terminal connected to the output terminal of MUX 254, and an output terminal. Data port 258 has an input/output terminal for conducting signal SDA, a first input terminal for receiving signal SCL, a second input terminal connected to the output terminal of ADC 256, a first output terminal connected to the data input terminal of RF AGC circuit 250, and a second output terminal connected to the control input terminal of MUX 254.

In basic operation, television receiver 200 is part of a product such as a digital television. The heart of receiver 200 is television tuner IC 230, which integrates many of the components of television receiver 200. As will be described more fully below, television tuner IC 230 supports an improved AGC technique that allows receiver 200 to be well suited for processing both analog and digital television signals and for receiving channels with differing signal characteristics.

Antenna 210 receives a broadband RF television signal. For example in the case of an NTSC receiver, the band of interest is from 48 to 870 MHz, but other television signaling systems are possible. Note that other signal sources such as community access television (CATV) connections may provide the broadband RF television signal as well. Attenuator 220 controllably attenuates the broadband RF television signal to provide RF_I to television tuner IC 230.

Television tuner IC 230 includes a processing path 240 that tunes a selected channel by mixing RF_I to a fixed IF. LNA 241 amplifies RF_I by an amount that can be varied based on the control input thereof. Note that FIG. 2 illustrates the attenuation as being integral with LNA 241, but it may be implemented either as a direct adjustment to the gain of LNA 241 or as a separate attenuator connected to the input or output of the LNA. The output of LNA 241 is then mixed to the selected IF using mixing element 242. LO is selected to mix a desired channel to the selected IF, and is conveniently determined by a microcontroller (not shown in FIG. 2) responsive to a user input providing a digital selection signal through data port 258 to control an on-chip or off-chip frequency synthesizer (not shown in FIG. 2). The mixed signal is then filtered in a bandpass filter 243 having a passband centered around the selected IF. Television tuner IC 230 provides two amplifiers 244 and 245 that appropriately drive the inputs of external SAW filters 260 and 280. The outputs of SAW filters 260 and 280 are respectively provided to two demodulators. The first demodulator, connected to the output of SAW filter 260, implements the ATSC (North American digital) television standard. The second demodulator implements the NTSC (North American analog) television standard. Each of the two demodulators, when enabled, provides drive signals to other devices such as MPEG decoders and analog video decoders, which in turn provide drive signals to video devices such as cathode ray tubes (CRTs), liquid crystal displays (LCDs), plasma displays, or the like and audio devices.

Automatic Gain Control (AGC)

Television tuner IC 230 includes gain elements for both the RF and IF signals. Television tuner IC 230 performs AGC by altering the gain of attenuator 220 and/or LNA 241. Attenuator 220 typically provides about 40 decibels (dB) of gain range, whereas LNA 241 provides about 9 dB of gain range. Television tuner IC 240 alters the gain of attenuator 220, which may be in the form of a P-intrinsic-N (PIN) diode attenuator (π-shaped or T-shaped), a dual-gate MOSFET, or the like, through D_AGC.

Receiver 200 selectively uses three power detectors (251, 252, and 292) to perform AGC. Power detectors 251 and 252 are implemented on television tuner IC 230, whereas power detector 292 is part of NTSC demodulator 290 and is external to television tuner IC 230. A bit field in a register in data port 258 is used to set the threshold (i.e. the trip point) of the signal at the input to mixing element 242. Another bit field in the register is used to set the threshold of the signal at the input to amplifiers 244 and 245. In the illustrated embodiment these bit fields are each three bits in length with one encoding indicating that the power detector is disabled, as described further below. Note that power detectors 251 and 252 can be designed to measure peak power or average power, but in the illustrated embodiment measure a hybrid of peak and average power.

RF AGC circuit 250 receives the three detected power inputs, and selectively adjusts the gains of attenuator 220 and/or LNA 241 in response. In general it is desirable for receiver 200 to operate at maximum gain without distorting the signal at any point in the processing path. RF AGC circuit 250 accomplishes gain reduction by allowing maximum gain unless any power detector indicates a signal level above its threshold. When excessive gain is detected by any available power detector, in one embodiment, RF AGC circuit 250 reduces the gain by first reducing the gain of LNA 241, and then by reducing the level of RF_I through attenuator 220. In this manner television tuner IC 230 ensures that none of the circuits in signal processing path 240 distorts the signal. Other techniques for managing the gain between the two attenuation elements will be described below.

Television tuner IC 230 includes several programmable features to provide a high degree of flexibility. As described above, the register in block 258 receives and stores thresholds for each power detector. When the power detected by a particular power detector exceeds its corresponding programmed threshold, then RF AGC circuit 250 attenuates RF_I in a selected one of attenuator 220 and LNA 241. Moreover a field in a register in data port 258, such as the threshold field, can be set to effectively disable the power detector such that it does not participate in the AGC function. Thus programming this field appropriately is analogous to opening a switch between the power detector and RF AGC circuit 250.

Unlike a conventional receiver with AGC, receiver 200 includes multiple power detectors that measure the power at multiple points in the signal processing stream and can be used to control the gain in a manner more appropriate to the signal type. Since it is difficult to discriminate wanted from unwanted signal power in a broadband signal, power detectors are placed after each filter. Accordingly power detector 252 is placed after bandpass filter 243, and power detector 292 measures the power after the signal has been filtered in SAW filter 280. Placing a power detector after each filter enables receiver 200 to more accurately determine the power of the desired signal.

Moreover, using multiple power detectors allows external AGC control to be distributed across multiple gain elements to prevent clipping and thus distortion may be reduced while maintaining an acceptable signal level.

Known television tuner ICs include an ADC for general-purpose use such as detecting the AFT (Automatic Fine Tune) pin on an analog demodulator. However according to another feature of the present invention, television tuner IC 230 includes an ADC 256 which is selectively connected through MUX 254 to the input of ADC 256 to also measure the AGC control voltage from power detector 292 or the AGC control voltage from power detectors 252 and 251, which may be the value of the voltage on the time constant capacitor. Television tuner IC 230 makes these values available to an external microcontroller connected to data port 258, which can use this information to adjust the threshold for any power detector during operation.

According to another aspect of the present invention, AGC parameters could be set on a per-channel basis. An algorithm to implement this feature is as follows. The receiver at initial power-on would be programmed to scan the spectrum for all available channels. Weak channels and strong channels could be detected, intermodulation distortion interference spectra could be calculated for each channel and thresholds set appropriately for each channel. The microcontroller attached to receiver 200 could store the thresholds in a table, such as in nonvolatile memory, that could be used to re-configure television tuner IC 230 through data port 258 each time a new channel is selected with the thresholds determined to be optimum for that channel.

Note that a receiver with improved AGC could be used for a variety of applications including digital televisions, set top boxes, and the like. Also the technique is applicable to a variety of existing analog and digital television standards.

Furthermore the AGC technique is applicable to receivers tuning other types of signals from broadcast spectra, such as broadcast radio, satellite radio, and the like. The disclosed receiver used inputs from three power detectors to control the gain through attenuation in two controllable elements, but different numbers of such elements are also possible.

Control of Attenuation Devices

In the embodiment described above, RF AGC circuit 250 reduced the level of the received signal by first reducing the gain of LNA 241, and then by reducing the gain of attenuator 220. However managing the attenuation between the two attenuation devices in a different manner that will be described below can be advantageous in integrated circuit implementations.

Figure 3:
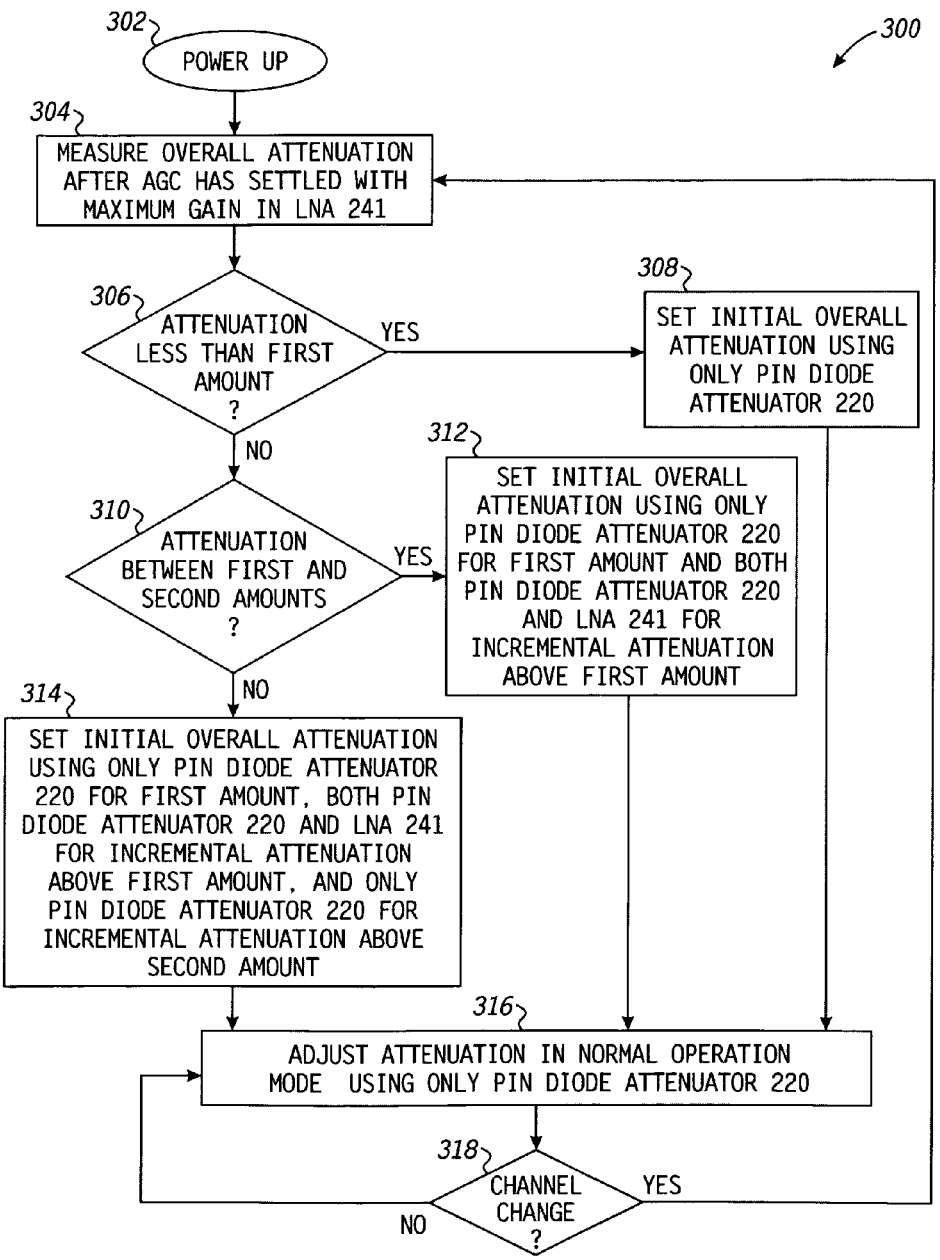
FIG. 3 illustrates a flow chart useful in understanding how the RF AGC circuit of FIG. 2 sets the initial overall attenuation and operates the AGC loop thereafter.

FIG. 3 illustrates a flow chart 300 useful in understanding how RF AGC circuit 250 of FIG. 2 sets the initial overall attenuation and operates the AGC loop thereafter. Flow starts at step 302, when receiver 200 is powered up. At this point, receiver 200 enters a calibration mode. Depending on which power detector is chosen by the user, the AGC loop will settle using that power detector to ensure that the signal level is at the user-defined level. Note that LNA 241 is initially set to maximum gain so that once the loop has settled, the voltage on pin C_AGC represents the front-end attenuation of PIN diode attenuator 220. At step 304, receiver 200 measures the overall attenuation by measuring voltage C_AGC using ADC 256. Once this initial overall attenuation is known, receiver 200 divides it between PIN diode attenuator 220 and LNA 241 in a manner described in the following paragraphs.

This initial overall attenuation is then compared to a first amount in decision box 306. If the desired attenuation is less than the first amount then, at step 308, AGC circuit 250 sets the initial overall attenuation using only PIN diode attenuator 250. Thus a relatively weak signal can be attenuated completely in PIN diode attenuator 250 while retaining enough additional attenuation range for use in normal operation mode, as will be described further below.

If not, then flow proceeds to decision box 310, which determines whether the initial overall attenuation is between the first amount and a second amount. If so, then, at step 308, AGC circuit 250 sets the initial overall attenuation using only pin diode attenuator 220 for the first amount, and both PIN diode attenuator 220 and LNA 241 for the incremental attenuation above the first amount.

If not, then flow proceeds to step 314, in which the initial overall attenuation is set using only PIN diode attenuator 220 for the first amount, both PIN diode attenuator 220 and LNA 241 for the incremental attenuation above the first amount and less than the second amount, and only PIN diode attenuator 220 for the additional incremental attenuation above the second amount.

Regardless of how the initial overall attenuation is set, flow then proceeds to step 316, at which point receiver 200 enters a normal operation mode. In the normal operation mode, the attenuation is adjusted continuously by the operation of the AGC loop using only PIN diode attenuator 220. LNA 241 is not further adjusted by virtue of the operation of the AGC loop in normal operation mode, except as may be required for extremes of signal strength.

At decision box 318, receiver 200 checks whether there has been a channel change. If the user has not changed the channel, receiver 200 remains in normal operation mode and flow returns to step 316. If the user has changed the channel, then receiver 200 re-enters calibration mode and flow proceeds to step 304 and a new initial overall attenuation is determined for the new channel.

Figure 4:
FIG. 4 illustrates a table representing how the receiver of FIG. 2 divides the initial overall attenuation between the two attenuation devices.

FIG. 4 illustrates a table 400 representing how receiver 200 of FIG. 2 divides the initial overall attenuation between the two attenuation devices. As seen in table 400, PIN diode attenuator 220 is attenuated in the manner shown over the entire 50 dB of attenuation/gain range. However LNA 241 is attenuated only in a middle portion of the attenuation/gain range. Table 400 includes three portions 410, 420, and 430 corresponding to different ranges of the initial overall attenuation.

First portion 410 corresponds to a relatively weak signal, and the initial overall attenuation is between 0 and 10 dB. In first portion 410, the initial overall attenuation is set using only PIN diode attenuator 220, and the attenuation of LNA 241 remains at 0 dB.

Second portion 420 corresponds to a signal of intermediate strength, in which the initial overall attenuation is between 10 and 30 dB. In second portion 420, the initial overall attenuation is set using only PIN diode attenuation 220 for the first 10 dB, and both PIN diode attenuator 220 and LNA 241 for the incremental attenuation above 10 dB. As shown in table 400, the attenuation in the middle range is divided between PIN diode attenuator 220 and LNA 241 in alternating, 1 dB steps.

Third portion 430 corresponds to a relatively strong signal, in which the initial overall attenuation is between 30 and 50 dB. In third portion 430, the initial overall attenuation is set using only PIN diode attenuator 220 for the first 10 dB, both PIN diode attenuator 220 and LNA 241 for the incremental attenuation between 10 and 30 dB, and again only PIN diode attenuator 220 for the incremental attenuation above 30 dB.

For example, measurement of the signal level during the calibration period may show that the signal level is weak and that only 15 dB of attenuation is needed for the initial overall attenuation. According to table 400, RF AGC circuit 250 will provide the 15 dB of attenuation by setting the attenuation of PIN diode attenuator 220 to 12 dB and the attenuation of LNA 241 to 3 dB. Subsequently during the normal operation mode, no further attenuation is performed in LNA 241. Thus the available attenuation range (without clicks) will be between 3 dB and 43 dB. In the presence of slow fading, RF AGC circuit 250 will be able to decrease the attenuation by about 12 dB. On the other hand, measurement of the signal level during the calibration period may show that the signal level is strong and that 32 dB of attenuation is needed for the initial overall attenuation. According to table 400, RF AGC circuit 250 will provide the 32 dB of attenuation by setting the attenuation of PIN diode attenuator 220 to 22 dB and the attenuation of LNA 241 to 10 dB. Subsequently during normal operation, no further attenuation is performed in LNA 241. Thus the available attenuation range (without clicks) will be between 10 dB and 50 dB. In the presence of slow fading, RF AGC circuit 250 will be able to decrease the attenuation by about 22 dB.

An important advantage of this technique is that it facilitates the implementation of integrated circuit tuner 230 in standard complementary metal oxide semiconductor (CMOS) processes. Terrestrial analog TV tuners require about 50 dB of continuous gain range for reliable reception of both strong and weak signals. However when attenuator 220 is implemented as a PIN diode attenuator, it is only able to provide about 40 dB of gain range. Thus LNA 241 is required to provide the remaining 10 dB of gain range. The attenuation of LNA 241 can only be adjusted in discrete steps in order to provide lower noise, higher linearity, and lower power consumption than a comparable, continuous design when implemented in standard CMOS processes. Thus the discrete steps allow receiver 200 better to meet its noise, linearity, and power consumption requirements. In the illustrated embodiment, RF AGC circuit 250 controls LNA 241 over the 10 dB range using ten, 1-dB discrete steps, but in other embodiments the step size could be a different amount.

By providing LNA 241 with variable gain in discrete steps, receiver 200 can be integrated easily in modem CMOS integrated circuit technology. At the same time, by not using LNA 241 and instead relying on PIN diode attenuator 220 for the AGC control loop in normal operation mode, receiver 200 spares the user from uncomfortable clicks that would otherwise arise when switching gain/attenuation in discrete amounts because the attenuation of PIN diode attenuator 220 can be varied continuously.

In addition, TV receivers are subject to a problem known as the slow fading problem. Slow fading occurs when, for example, a user is initially proximate to a television transmitter, but then moves away so that the signal strength slowly fades. Thus the initial attenuation must be high, but then reduced as the signal strength fades. To understand how the receiver 230 solves this problem, first note that AGC calibration is performed when the user first powers on the television or when the user changes the channel. During the initial AGC calibration, RF AGC circuit 250 sets the attenuation of both PIN diode attenuator 220 and LNA 241. Changing the gain of LNA 241 in discrete steps during normal operation would cause "glitches" or discontinuities that would be noticeable to the user. However during power-on or channel change, the user will not notice the glitches because the video display device and audio output are disabled.

Conversely, the signal strength may slowly increase as receiver 200 moves closer to a terrestrial transmitter. In this case, it is important for PIN diode attenuator 220 to be able to add a significant amount of attenuation. Using LNA 241 in the middle part of the attenuation/gain range allows for a "slow increase" in signal strength as well.

In other embodiments, the particular range over which LNA 241 is used to form the initial overall attenuation may vary. In arriving the attenuations shown in table 400, however, the inventors considered both noise figure, usually measured in signal-to-noise ratio (SNR), and the ability of receiver 200 to react to slow fading or slow increase. The need to improve noise figure favors providing as much attenuation in LNA 241 as possible. However the need to accommodate slow fading and slow increase favors attenuating in PIN diode attenuator 220 alone at the high and low ends of the attenuation/gain range. Thus the inventors used the available attenuation of LNA 241 to provide the initial overall attenuation in the middle portion of the attenuation/gain range.

There are several alternate ways of providing the attenuation for the AGC loop than those set forth above. In particular in other embodiments the attenuation steps can be any other suitable values besides 1 dB. Also the 10 dB-30 dB range for forming the initial overall attenuation using both elements may vary in other embodiments. Since the receiver can be useful for other applications besides broadcast television, the amount of protection against slow fading and slow increase can vary as appropriate.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of automatic gain control (AGC) comprising:
    attenuating a radio frequency (RF) signal using first and second attenuation elements;
    determining an initial overall attenuation of the RF signal;
    selectively setting attenuations of the first attenuation element and the second attenuation element, based on a size of the initial overall attenuation, to configure the initial overall attenuation during a calibration mode; and
    adjusting the initial overall attenuation of the RF signal using only the first attenuation element during a normal operation period; and
    wherein selectively setting the initial overall attenuation further comprises:
        setting the initial overall attenuation using only the first attenuation element when the initial overall attenuation is less than a first amount;
        when the initial overall attenuation is between the first amount and a second amount, providing a first incremental attenuation above the first amount using both the first attenuation element and the second attenuation element; and
        when the initial overall attenuation is greater than the second amount, providing a second incremental attenuation above the second amount using only the first attenuation element.

2. The method of claim 1 wherein selectively setting attenuations of the first attenuation element and the second attenuation element comprises setting the initial overall attenuation using both the first and second attenuation elements in response to one of a power up or a channel switching of a television receiver.

3. The method of claim 1 wherein selectively setting attenuations of the first attenuation element and the second attenuation element comprises setting the attenuation of the second attenuation element in a selected one of a plurality of discrete steps.

4. The method of claim 3 wherein the second attenuation element comprises an integrated low noise amplifier.

5. The method of claim 3 wherein the adjusting the initial overall attenuation of the RF signal using only the first attenuation element during the normal operation period comprises attenuating the RF signal continuously using the first attenuation element during the normal operation period.

6. The method of claim 1 further comprising attenuating the RF signal using the first attenuation element to obtain an intermediate attenuated signal and attenuating the intermediate attenuated signal using the second attenuation element to form an attenuated RF signal.

7. The method of claim 6 further wherein the attenuating the RF signal using the first attenuation element comprises attenuating the RF signal using a PIN diode attenuator.

8. The method of claim 1 wherein selectively setting the initial overall attenuation using only the first attenuation element when the initial overall attenuation is less than the first amount comprises setting the initial overall attenuation using only the first attenuation element when the initial overall attenuation is less than about 10 decibels (dB).

9. The method of claim 1 wherein the providing the first incremental attenuation above the first amount using both the first attenuation element and the second attenuation element when the initial overall attenuation is between the first amount and the second amount comprises providing the first incremental attenuation above the first amount using both the first attenuation element and the second attenuation element when the initial overall attenuation is between about 10 dB and about 30 dB.

10. The method of claim 9 wherein the providing the first incremental attenuation above the first amount using both the first attenuation element and the second attenuation element when the initial overall attenuation is between the first amount and the second amount further comprises providing the first incremental attenuation above the first amount using both the first attenuation element and the second attenuation element in an alternating fashion in discrete steps of about 1 dB.

11. The method of claim 1, wherein selectively setting attenuations of the first attenuation element and the second attenuation element comprises:
   detecting a channel change during the normal operation period; and
   re-entering the calibration mode to selectively set the attenuations of the first attenuation element and the second attenuation element to reconfigure the initial overall attenuation in response to detecting the channel change.

12. A receiver comprising:
   a signal path having an input for receiving a radio frequency (RF) signal, and an output, and comprising first and second attenuation elements;
   a power detector having an input coupled to the output of the signal path, and an output; and
   an automatic gain control (AGC) circuit having an input coupled to the output of the power detector, and outputs coupled to the first and second attenuation elements, wherein the AGC circuit selectively sets attenuations of the first and second attenuation elements to provide an initial overall attenuation, based on a size of the initial overall attenuation; and
   wherein the AGC circuit adjusts a subsequent attenuation using only the first attenuation element in a normal operation mode; and
   wherein the AGC circuit further provides a first incremental attenuation above a first amount using both the first attenuation element and the second attenuation element when the initial overall attenuation is between the first amount and a second amount, and provides a second incremental attenuation above the second amount using only the first attenuation element when the initial overall attenuation is greater than the second amount.

13. The receiver of claim 12 wherein the first attenuation element comprises a PIN diode attenuator.

14. The receiver of claim 12 wherein the second attenuation element comprises an integrated low noise amplifier.

15. The receiver of claim 14 wherein an attenuation of the second attenuation element is selectable in one of a plurality of discrete steps.

16. The receiver of claim 12, wherein the AGC circuit is configured to detect a channel change during the normal operation mode and to selectively reset the attenuations of the first and second attenuation elements to reconfigure the initial overall attenuation in response to detecting the channel change.

* * * * *